United States Patent
McIlwaine

(10) Patent No.: US 12,378,140 B2
(45) Date of Patent: Aug. 5, 2025

(54) METHODS FOR MONITORING BIOFOULING IN CLOSED WATER SYSTEMS

(71) Applicant: CHEMTREAT, INC., Glen Allen, VA (US)

(72) Inventor: Douglas McIlwaine, Ashland, VA (US)

(73) Assignee: CHEMTREAT, INC., Glen Allen, VA (US)

(*) Notice: Subject to any disclaimer, the term of this patent is extended or adjusted under 35 U.S.C. 154(b) by 154 days.

(21) Appl. No.: 17/380,241

(22) Filed: Jul. 20, 2021

(65) Prior Publication Data

US 2022/0024791 A1 Jan. 27, 2022

Related U.S. Application Data

(60) Provisional application No. 63/057,015, filed on Jul. 27, 2020.

(51) Int. Cl.
*C02F 1/68* (2023.01)
*G01N 30/02* (2006.01)

(52) U.S. Cl.
CPC .............. *C02F 1/68* (2013.01); *G01N 30/02* (2013.01); *C02F 2209/15* (2013.01); *C02F 2305/00* (2013.01); *G01N 2030/027* (2013.01)

(58) Field of Classification Search
CPC .. C02F 3/302; C02F 3/006; C02F 3/34; C02F 3/341; C02F 3/342; C02F 2101/163; C02F 2101/166; C02F 3/307; C02F 3/305; C02F 1/68; C02F 2209/15; C02F 2305/00; C02F 2103/023; C02F 2209/005; C02F 1/008; C02F 1/50; C02F 1/76; C02F 2303/20; C02F 2101/16; G01N 30/02; G01N 2030/027
See application file for complete search history.

(56) References Cited

U.S. PATENT DOCUMENTS 11,230,482 B2   1/2022   Baron et al.
2005/0224409 A1* 10/2005 Harshman ............... C02F 3/006
                                                                210/209

(Continued)

OTHER PUBLICATIONS

Mohanakrishnan, J., Gutierrez, O., Sharma, K.R., Guisasola, A., Werner, U., Meyer, R.L., Keller, J. and Yuan, Z., 2009. Impact of nitrate addition on biofilm properties and activities in rising main sewers. Water research, 43(17), pp. 4225-4237 (Year: 2009).*

(Continued)

*Primary Examiner* — Magali P Slawski
*Assistant Examiner* — Bernadette Karen McGann
(74) *Attorney, Agent, or Firm* — Oliff PLC

(57) ABSTRACT

Methods are described for monitoring biofouling in a closed water system. For example, a method includes adding nitrate to water circulating in the closed water system, and detecting whether nitrite is present in the water after adding the nitrate. Another method includes introducing chlorite into water circulating in the closed water system, the detecting the amount of chlorite present in the water; and at least one of (i) comparing the detected amount of chlorite to an expected amount of chlorite; and (ii) observing whether the amount of chlorite in the water decreases over time.

10 Claims, 1 Drawing Sheet

(56) References Cited

U.S. PATENT DOCUMENTS

| | | | | |
|---|---|---|---|---|
| 2010/0239555 A1* | 9/2010 | Govind | ............... | C02F 3/342 |
| | | | | 435/252.4 |
| 2011/0052656 A1* | 3/2011 | Whitekettle | ............ | C02F 1/50 |
| | | | | 424/665 |
| 2011/0056693 A1* | 3/2011 | Wallace | ............... | C09K 8/54 |
| | | | | 210/764 |
| 2012/0171271 A1* | 7/2012 | Loontjens | ............... | C02F 1/50 |
| | | | | 977/773 |

OTHER PUBLICATIONS

Nightingale, A.M., Hassan, S.U., Warren, B.M., Makris, K., Evans, G.W., Papadopoulou, E., Coleman, S. and Niu, X., 2019. A droplet microfluidic-based sensor for simultaneous in situ monitoring of nitrate and nitrite in natural waters. Environmental science & technology, 53(16), pp. 9677-9685 (Year: 2019).*

Ding, X., Wei, D., Guo, W., Wang, B., Meng, Z., Feng, R., Du, B. and Wei, Q., 2019. Biological denitrification in an anoxic sequencing batch biofilm reactor: Performance evaluation, nitrous oxide emission and microbial community. Bioresource technology, 285, p. 121359 (Year: 2019).*

De Beer, D.I.R.K., Schramm, A., Santegoeds, C.M. and Kuhl, M., 1997. A nitrite microsensor for profiling environmental biofilms. Applied and environmental microbiology, 63(3), pp. 973-977 (Year: 1997).*

Beaton, A.D., Cardwell, C.L., Thomas, R.S., Sieben, V.J., Legiret, F.E., Waugh, E.M., Statham, P.J., Mowlem, M.C. and Morgan, H., 2012. Lab-on-chip measurement of nitrate and nitrite for in situ analysis of natural waters. Environmental science & technology, 46(17), pp. 9548-9556 (Year: 2012).*

Mohanakrishnan, et al., "Impact of nitrate addition on biofilm properties and activities in rising main sewers", Water Research, Sep. 2009, vol. 43, No. 17, p. 4225-4237; especially p. 4226, col. 2, para 4; p. 4227, col. 2, para 3; Tables 1, 5.

* cited by examiner

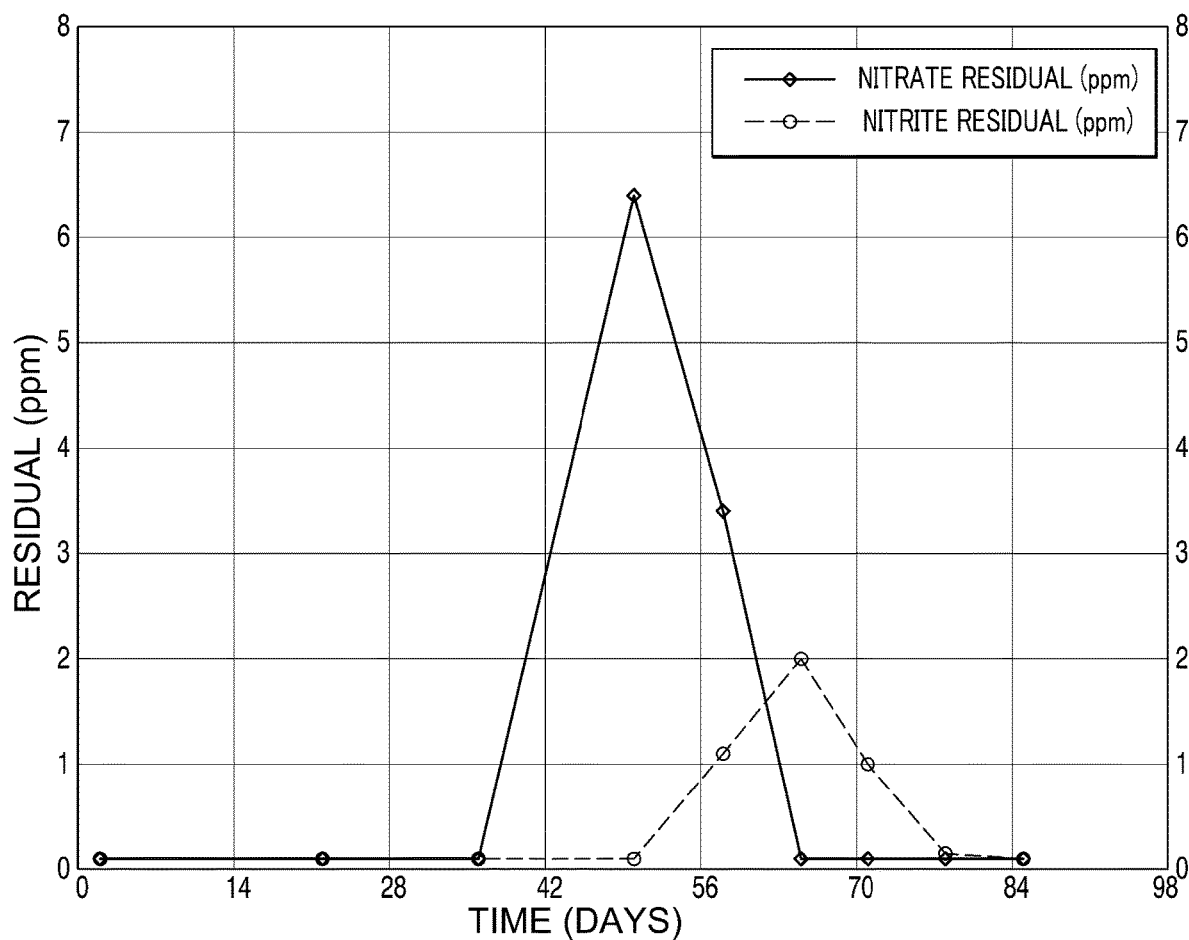

METHODS FOR MONITORING BIOFOULING IN CLOSED WATER SYSTEMS

CROSS-REFERENCE TO RELATED APPLICATION

This nonprovisional application claims the benefit of U.S. Provisional Application No. 63/057,015, filed Jul. 27, 2020.

BACKGROUND

Biofouling is a detrimental type of fouling experienced in industrial water treatment applications. Regardless of industry, water treatment experts spend a considerable amount of time focused on preventing biofouling of heat exchangers, cooling towers, process water storage vessels, and other areas serviced by various industrial cooling and process waters. One particularly difficult form of biofouling occurs when large collections of groups of sessile bacterial cells adhere to a surface in process equipment or conduits to produce a biofilm.

Biofilms reduce conductive heat transfer across surfaces and can clog hydraulic systems, leading to energy losses and possible production cutbacks and shutdowns. And microbes present in the deeper layers of the biofilm can promote microbially induced corrosion (MIC) by producing acid that causes corrosion. This can increase the corrosion rate of the metal/alloy surface by altering its surface electrochemical properties. Thus, biofilms can cause process equipment to perform poorly and can lead to substantial costs and lost revenues. Therefore, biofilm monitoring and control are essential to ensure optimal water system reliability and efficiency.

Biofouling is sometimes monitored indirectly by determining the amount of planktonic bacteria in water samples. However, attached bacterial numbers can exceed planktonic numbers by three to four logarithm units in water systems, and thus planktonic count is not a reliable indicator of the extent of biofilm formation.

Other traditional methods include biofilm scraping from defined, representative surface areas, or monitoring test substrates known as "coupons," located in situ. However, these methods require significant amounts of time to allow for biofilm formation on the coupon surface or other designated surface.

There is a need for a better method for monitoring biofouling in a closed water system.

SUMMARY

It is an object of the disclosed embodiments to provide an effective solution for quickly and efficiently monitoring biofouling in a closed water system. The disclosed methods can be used for biofilm detection at its initial stage of development, and thus can function as an early warning system.

In one aspect, this disclosure provides a method for monitoring biofouling in a closed water system, the method including steps of adding nitrate to water circulating in the closed water system; and detecting whether nitrite is present in the water after adding the nitrate.

In another aspect, this disclosure provides a method for monitoring biofouling in a closed water system, the method including steps of introducing chlorite into water circulating in the closed water system, the detecting the amount of chlorite present in the water; and at least one of (i) comparing the detected amount of chlorite to an expected amount of chlorite; and (ii) observing whether the amount of chlorite in the water decreases over time.

BRIEF DESCRIPTION OF THE DRAWING

The FIGURE is a graph representing the conversion of nitrate to nitrite in a closed water system in which denitrifying bacteria were determined to be present.

DETAILED DESCRIPTION OF EMBODIMENTS

This disclosure provides methods for detecting the formation of biofilms in closed water systems.

Biofilms are complex surface-attached microbial communities whose cells are embedded in a self-produced matrix of extracellular polymeric substances (EPSs), which are responsible for maintaining the integrity of the biofilm's three-dimensional structure. The biofilm matrix is a gel-like structure of mainly polysaccharides, proteins, amyloids, extracellular nucleic acids and amphiphilic compounds such as glycolipids and peptidolipids. The matrix encloses and binds together the microbes in the biofilm, thus providing considerable mechanical stability.

As indicated above, bacteria are often present in waters used in industrial processes, such as heat exchanger and cooling tower waters. Free swimming bacteria in the water are referred to as planktonic bacteria. When these bacteria form biofilms, they are referred to as sessile bacteria. The sessile bacteria in biofilms take on substantially different attributes than their planktonic counterparts, including transcribing different genes. Sessile bacteria also operate in an oxygen-deficient environment and become anaerobic within the bulk of the biofilm.

The biofilms can include denitrifying bacteria that convert nitrate to nitrite under anaerobic conditions (such as those found within biofilms). The transformation from nitrate to nitrite is performed by nitrate reductase in the bacteria:

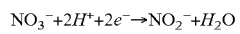

$$NO_3^- + 2H^+ + 2e^- \rightarrow NO_2^- + H_2O$$

The diversity of denitrifying bacteria is very large, and thus denitrifying bacteria can thrive in extreme environments such as environments that are highly saline and high in temperature.

Biofilms can also include sulfate-reducing bacteria, which reduce sulfate to sulfide ($H_2S$ or $S^{2-}$) under anaerobic conditions. Sulfate-reducing bacteria are anaerobic microorganisms that use sulfate as a terminal electron acceptor in, for example, the degradation of organic compounds.

The inventor discovered that biofilm formation can be effectively monitored by harnessing the metabolic pathways of these anaerobic bacteria. In particular, nitrite and chlorite can be used as markers for detecting the presence of bacterial populations that are greater than threshold limits indicative of a likelihood of biofilm formation, such as at least $10^2$ CFU/ml, for example $10^2$ to $10^6$ CFU/ml or $10^3$ to $10^4$ CFU/ml. The markers can be used alone or in combination, as discussed in more detail below.

Monitoring Formation of Biofilms Including Denitrifying Bacteria

The disclosed embodiments include a method of detecting the presence of denitrifying bacteria in a closed water system by detecting the conversion of nitrates to nitrites. Because denitrifying bacteria are anaerobic bacteria, their presence is indicative of biofilm formation.

In order to monitor conversion of nitrate to nitrite, the method includes introducing nitrate into a water stream in the closed water system. Nitrate is frequently included in biocide formulations. Thus, the nitrate can be administered separately or in conjunction with an existing biofilm treatment regimen.

Nitrate is a very stable ion, and is difficult to remove from closed water systems due to its inertness and the solubility of nitrate salts. However, denitrifying bacteria can easily metabolize nitrate and remove it from solution. When denitrification occurs, nitrate is converted first to nitrite, then ultimately to nitrogen gas. Because nitrate is typically very stable, any reduction above the usual error in measurement by the instrument could indicate conversion to nitrite; however nitrite itself is also very easily detected (e.g., by ion chromatography). Thus, the appearance of the nitrite, particularly together with a concomitant decrease in nitrate residuals, can indicate that denitrification is occurring, and that areas of anaerobic activity (from biofilm formation) are likely present.

The nitrate can be added in sufficient amounts to detect denitrifying bacteria in existing biofilms, which may correspond to amounts of 0.5 ppm to 100 ppm, from 1 ppm to 30 ppm, from 2.5 ppm to 25 ppm, or from 5 to 10 ppm (based on the amount of nitrate ion in the water). The nitrate can be added to the biofilm-containing water in bulk as a solid or as an aqueous solution (e.g., nitrate salt solutions that include the nitrate salt in amounts of from 0.1 to 20 wt %, 0.5 to 10 wt %, or 1 to 5 wt %).

The source of nitrate added to the water system is not limited. For example, the nitrate can be added in the form of magnesium nitrate ($Mg(NO_3)_2$), cupric nitrate ($Cu(NO_3)_2$), or sodium nitrate ($NaNO_3$).

Alternatively, a nitrate precursor compound can be added to the water in order to indirectly introduce nitrate, as long as the compound would be expected to produce nitrate in the existing environment.

The nitrate can be stored in a tank or other storage container, and can be pumped or metered into the water system as needed and in the desired amounts. The nitrate can be added at any suitable location in the water system where the nitrate will react with the denitrifying bacteria of the biofilm, including adding it at the location of the biofilm or upstream of the location of the biofilm. The nitrate can be added to the water on a continuous basis, a periodic basis, or an intermittent basis depending on the desired frequency for monitoring for biofilm formation. For example, the nitrate can be administered weekly, once every two weeks, monthly, or quarterly.

The method also includes monitoring the amount of nitrite and/or nitrate present in the water stream after the nitrate has been introduced. For example, the residuals (including nitrates and nitrites) present in the system can be monitored by ion chromatography. A sample can be taken from downstream of where the nitrate was initially introduced.

If nitrite is detected in the water stream in an amount above a minimum threshold level, and/or if a minimum threshold decrease in the amount of nitrate is detected, then this can be indicative of biofilm formation, and thus a determination can be made that a biofilm is present. For example, a biofilm can be determined to be present when the amount of nitrite ion in the water is greater than 0.5 ppm, 1 ppm, 5 ppm, 10 ppm, or 30 ppm, or when the amount of nitrite ion in the water increases by an amount greater than 0.5 ppm, 1 ppm, 2 ppm, or 5 ppm or more. Likewise, a biofilm can be determined to be present when the amount of nitrate ion in the water decreases by an amount greater than 0.5 ppm, 1 ppm, 2 ppm, 5 ppm, or more.

The amount of time in which the increase in the amount of nitrite ion and/or the decrease in the amount of nitrate ion can be detected may depend to some extent on the amount of bacteria present in the system that are capable of carrying out the conversion of nitrate to nitrite. The faster the conversion is detected, the more bacteria are present in the system. Thus, the method could also be used to estimate the size of the bacterial population.

Once the biofilm has been detected, the water can be appropriately treated to reduce or eliminate the biofilm. For example, the treatment can include administering a biocide effective to reduce the denitrifying bacterial population in the treated water by at least a factor of 10, at least a factor of 50, or at least a factor of 100. For example, after the treatment, the treated water can have a denitrifying bacterial population that is less than $10^5$ CFU/ml, such as less than $10^4$, or from $10^3$ to $10^4$ CFU/ml, for example.

Commonly used biocides for treating biofouling in closed loop systems (for example, for attacking biofilms including denitrifying bacteria) include nonoxidizing biocides such as isothiazolone, glutaraldehyde, tributyl-tetradecyl-phosphonium chloride, and quaternary ammonium compounds; and oxidizing biocides such as chlorine dioxide and hydrogen peroxide.

The biocide can be stored in a tank or other storage container, and can be pumped or metered into the water system as needed and in the desired amounts. The addition of biocide can be automated by using a controller that sends signals to equipment such as pumps and valves that are connected to the biocide storage container. The controller can receive input signals from sensors in the water system that detect the presence of nitrite, an increase in nitrite levels, and/or a decrease in nitrate levels. The controller can be programmed to automatically begin dosing biocide into the water system in response to any of these indicia, or if other indicia of biofilms are present. The dosing schedule can be based on a schedule that is stored in a memory or can be based on a control feedback loop based on sensor input.

EXAMPLE

A 4% active isothiazolone product containing nitrate was introduced into a closed circulating water system in weekly doses for two to three weeks. Each dose added approximately 100 ppm of the isothiazolone product, which resulted in approximately 1.5 to 2 ppm nitrate being introduced into the system.

Samples of the treated water were analyzed one week following each administered dose. Residuals were monitored using ion chromatography.

As shown in the FIGURE, nitrate levels increased immediately after administering the isothiazolone product. Nitrite was first observed 1-2 weeks after the last dose of the isothiazolone product was added, and continued to be detected for several weeks until it was depleted. The observable conversion of nitrate to nitrite indicated the presence of a biofilm containing denitrifying bacteria in the closed water system.

Monitoring Formation of Biofilms Including Sulfate-Reducing Bacteria

The disclosed embodiments also include a method of detecting the presence of sulfate-reducing bacteria in a closed water system by monitoring the consumption of chlorite by the sulfate-reducing bacteria. Sulfate-reducing bacteria are also anaerobic bacteria, and thus their presence is indicative of biofilm formation.

In order to monitor conversion of residuals by sulfate-reducing bacteria, the method includes introducing chlorite into a water stream in the closed water system. The chlorite can be administered directly or indirectly. For example, the method can include administering chlorine dioxide (a common biocide) into the water stream, and allowing the chlorine dioxide to react with different reactive species in the water stream to produce chlorite.

Chlorite, like nitrate, is a very stable ion, and is difficult to remove from closed water systems due to its inertness and the solubility of chlorite salts. If chlorine dioxide is used in a closed water system, its repeated use would be expected to lead to an increase in the amount of chlorite detected in the water. However, sulfate-reducing bacteria can easily metabolize chlorite and remove it from solution. Sulfate-reducing bacteria reduce sulfate to sulfide, which readily reacts with chlorite. Because chlorite is typically very stable, any reduction above the usual error in measurement by the instrument could indicate metabolism of chlorite by sulfate-reducing bacteria. Thus, if a lower than expected amount of chlorite is observed in the system (relative to the expected amount based on the amount of chlorite or chlorine dioxide added) it can indicate that sulfate-reducing bacteria are present, and thus that areas of anaerobic activity from biofilm formation are likely present. For example, if the repeated use of chlorine dioxide does not lead to the expected increase in chlorite residuals (based upon the amount of chlorine dioxide added), then it is highly likely that the chlorite is being consumed by reducing agents in the system—most likely sulfide produced by sulfate-reducing bacteria.

The chlorite or chlorite precursor (e.g., chlorine dioxide) can be added in sufficient amounts to detect sulfate-reducing bacteria in existing biofilms, which may correspond to amounts of 0.25 ppm to 100 ppm, from 0.5 ppm to 30 ppm, from 0.75 ppm to 20 ppm, or from 1 to 10 ppm (based on the amount of chlorite ion in the water).

As with the nitrate discussed above, the chlorite/chlorite precursor can be stored in a storage container or pumped into the water system as needed. The chlorite/chlorite precursor can be added at any suitable location in the water system where it will react with the sulfate-reducing bacteria of the biofilm. It can be added to the water on a continuous basis, a periodic basis, or an intermittent basis. For example, the chlorite can be administered weekly, once every two weeks, monthly, or quarterly.

The method also includes monitoring the amount of chlorite present in the water stream after the chlorite or chlorite precursor has been introduced. For example, the residuals (including chlorite) present in the system can be monitored by ion chromatography. A sample can be taken from downstream of where the chlorite or chlorite precursor was initially introduced.

If a minimum threshold decrease in the amount of chlorite is detected, then this can be indicative of biofilm formation, and thus a determination can be made that a biofilm is present. For example, a biofilm can be determined to be present when the amount of chlorite ion in the water decreases by an amount greater than 0.5 ppm, 1 ppm, 2 ppm, or 5 ppm.

The loss of chlorite due to reaction with sulfide is very fast, and thus biofilms can be quickly detected by using chlorite as a marker. For example, it would be very easy to observe and monitor the loss of chlorite on a daily basis.

The amount of time in which the decrease in the amount of chlorite ion can be detected may depend to some extent on the amount of sulfate-reducing bacteria present in the system. The faster the chlorite loss is detected, the more bacteria are present in the system. Thus, the method could also be used to estimate the size of the bacterial population.

As indicated above, this technique can be used alone or in combination with the method for detecting denitrifying bacteria, and the treatment to reduce the presence of biofouling can be the same. The treatment can be effective to reduce the sulfate-reducing bacterial population in the treated water by at least a factor of 10, at least a factor of 50, or at least a factor of 100. For example, after the treatment, the treated water can have a sulfate-reducing bacterial population that is less than $10^5$ CFU/ml, such as less than $10^4$, or from $10^3$ to $10^4$ CFU/ml, for example.

Commonly used biocides for treating biofouling in closed loop systems (for example, for attacking biofilms including sulfate-reducing bacteria) include nonoxidizing biocides such as isothiazolone, glutaraldehyde, and nitrogen- and phosphorus-based quaternary cationic biocides; and oxidizing biocides such as chlorine dioxide.

It will be appreciated that the above-disclosed features and functions, or alternatives thereof, may be desirably combined into different methods. Also, various alternatives, modifications, variations or improvements may be subsequently made by those skilled in the art, and are also intended to be encompassed by the disclosed embodiments. As such, various changes may be made without departing from the spirit and scope of this disclosure.

What is claimed is:

1. A method for monitoring biofouling in a closed loop water system, the method comprising:
    adding nitrate in the form of a bulk solid or an aqueous solution to water circulating in the closed loop water system so that an amount of nitrate ions in the water is at a first concentration;
    detecting conversion of nitrate ions to nitrite ions in the water by detecting both (i) the presence of the nitrite ions in the water, and (ii) a concomitant decrease in the amount of nitrate ions in the water from the first concentration to a second concentration;
    determining whether a biofilm is present in the closed loop water system based on the detected conversion of the nitrate ions to the nitrite ions in the water; and
    treating the water with a biocide effective to kill denitrifying bacteria if the biofilm is determined to be present in the closed loop water system.

2. The method of claim 1, wherein the nitrate is added in an amount in the range of from 0.5 ppm to 100 ppm, based on the amount of nitrate ions in the water.

3. The method of claim 1, wherein the nitrate is added in the form of magnesium nitrate, cupric nitrate, or sodium nitrate.

4. The method of claim 1, wherein the presence of nitrite ions and the concomitant decrease in the amount of nitrate ions are detected by ion chromatography.

5. The method of claim 1, wherein the nitrate is added on an intermittent basis.

6. The method of claim 1, wherein the nitrate is added on a periodic basis.

7. The method of claim 1, wherein the nitrate is added to the water in the form of a bulk solid.

8. The method of claim 1, wherein the nitrate is added to the water in the form of an aqueous solution.

9. The method of claim 1, further comprising estimating a size of the biofilm present in the closed loop water system based on a rate of the conversion of the nitrate ions to the nitrite ions in the water.

10. The method of claim 1, wherein the nitrate is added to the water in the form of an aqueous solution by metering the aqueous solution into the closed loop water system.

* * * * *